US010196553B2

United States Patent
Patil et al.

(10) Patent No.: US 10,196,553 B2
(45) Date of Patent: Feb. 5, 2019

(54) AQUEOUS SUSPENSIONS OF SILICA ADDITIVES

(71) Applicant: Halliburton Energy Services, Inc., Houston, TX (US)

(72) Inventors: Sandip P. Patil, Pune (IN); Rahul C. Patil, Pune (IN); Remitha Ak, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/035,993

(22) PCT Filed: Mar. 24, 2014

(86) PCT No.: PCT/US2014/031591
§ 371 (c)(1),
(2) Date: May 11, 2016

(87) PCT Pub. No.: WO2015/147781
PCT Pub. Date: Oct. 1, 2015

(65) Prior Publication Data
US 2016/0272870 A1      Sep. 22, 2016

(51) Int. Cl.
| | | |
|---|---|---|
| *C09K 8/46* | (2006.01) | |
| *C09K 8/84* | (2006.01) | |
| *C09K 8/40* | (2006.01) | |
| *C09K 8/16* | (2006.01) | |
| *C04B 22/00* | (2006.01) | |
| *C09K 8/14* | (2006.01) | |
| *C09K 8/487* | (2006.01) | |
| *C04B 28/02* | (2006.01) | |
| *C09K 8/60* | (2006.01) | |
| *C04B 111/00* | (2006.01) | |

(52) U.S. Cl.
CPC .............. *C09K 8/46* (2013.01); *C04B 22/004* (2013.01); *C04B 28/02* (2013.01); *C09K 8/145* (2013.01); *C09K 8/16* (2013.01); *C09K 8/40* (2013.01); *C09K 8/487* (2013.01); *C09K 8/84* (2013.01); *C09K 8/845* (2013.01); *C04B 2111/00474* (2013.01); *C09K 8/602* (2013.01)

(58) Field of Classification Search
None
See application file for complete search history.

(56) References Cited

U.S. PATENT DOCUMENTS

| 3,185,642 | A | * | 5/1965 | Sawyer, Jr. | ............ | C09K 8/145 |
|---|---|---|---|---|---|---|
| | | | | | | 507/140 |
| 3,220,947 | A | * | 11/1965 | Sawyer, Jr. | ............ | C09K 8/206 |
| | | | | | | 507/110 |
| 4,351,754 | A | * | 9/1982 | Dupre | .................... | A01N 25/04 |
| | | | | | | 524/445 |
| 5,989,336 | A | * | 11/1999 | Carpenter | ............ | C04B 14/104 |
| | | | | | | 106/718 |
| 2011/0073311 | A1 | | 3/2011 | Porcherie et al. | | |
| 2012/0210911 | A1 | | 8/2012 | Tarafdar et al. | | |
| 2013/0255948 | A1 | | 10/2013 | Michaux et al. | | |
| 2013/0261032 | A1 | | 10/2013 | Ladva et al. | | |

FOREIGN PATENT DOCUMENTS

| EP | 1887065 A1 | 2/2008 |
|---|---|---|
| NO | 316442 B1 | 1/2004 |

OTHER PUBLICATIONS

Norwegian Office Action dated Aug. 4, 2017; Norwegian Patent Application No. 20160766.
International Search Report dated Dec. 10, 2014; International PCT Application No. PCT/US2014/031591.

* cited by examiner

*Primary Examiner* — John J Figueroa
(74) *Attorney, Agent, or Firm* — McGuireWoods LLP

(57) ABSTRACT

A method of treating a subterranean formation comprising: forming a treatment fluid by adding a desired volume of a liquid concentrate suspension to at least a base fluid, wherein the treatment fluid comprises the liquid concentrate suspension and the base fluid, and wherein the liquid concentrate suspension comprises: (A) water; (B) an additive; and (C) a magnesium silicate clay, wherein the clay increases the viscosity of the water, wherein the liquid concentrate suspension is stable for a time period of at least 2 weeks; and introducing the treatment fluid into the subterranean formation.

17 Claims, No Drawings

AQUEOUS SUSPENSIONS OF SILICA ADDITIVES

TECHNICAL FIELD

Additives are commonly used in treatment fluids for oil or gas operations. A liquid concentrate suspension of one or more additives and methods of use are provided. The liquid concentrate suspension can be added to at least a base fluid to form a treatment fluid.

DETAILED DESCRIPTION OF THE INVENTION

As used herein, the words "comprise," "have," "include," and all grammatical variations thereof are each intended to have an open, non-limiting meaning that does not exclude additional elements or steps.

As used herein, a "fluid" is a substance that can flow and conform to the outline of its container when the substance is tested at a temperature of 71° F. (22° C.) and a pressure of one atmosphere "atm" (0.1 megapascals "MPa"). A fluid can be a liquid or gas. A fluid can have only one phase or more than one distinct phase. A heterogeneous fluid is an example of a fluid having more than one distinct phase. A heterogeneous fluid can be: a slurry, which includes a continuous liquid phase and undissolved solid particles as the dispersed phase; an emulsion, which includes a continuous liquid phase and at least one dispersed phase of immiscible liquid droplets; a foam, which includes a continuous liquid phase and a gas as the dispersed phase; or a mist, which includes a continuous gas phase and liquid droplets as the dispersed phase. There can be more than one dispersed phase of a heterogeneous fluid, but only one continuous phase. Moreover, any of the phases of a heterogeneous fluid can contain dissolved materials and/or undissolved solids. As used herein, a "base fluid" is the fluid in the largest concentration of a treatment fluid and can be, for example, the solvent of a solution or the continuous phase of a heterogeneous fluid.

As used herein, a "cement composition" is a mixture of at least cement and water. A cement composition can include additives. As used herein, the term "cement" means an initially dry substance that develops compressive strength or sets in the presence of water. An example of cement is Portland cement. A cement composition is generally a slurry in which the water is the continuous phase or base fluid of the slurry and the cement (and any other insoluble particles) is the dispersed phase. The continuous phase of a cement composition can include dissolved solids.

Oil and gas hydrocarbons are naturally occurring in some subterranean formations. In the oil and gas industry, a subterranean formation containing oil or gas is referred to as a reservoir. A reservoir may be located under land or off shore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir. The oil, gas, or water produced from the wellbore is called a reservoir fluid.

A well can include, without limitation, an oil, gas, or water production well, an injection well, or a geothermal well. As used herein, a "well" includes at least one wellbore. The wellbore is drilled into a subterranean formation. The subterranean formation can be a part of a reservoir or adjacent to a reservoir. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered the region within approximately 100 feet radially of the wellbore. As used herein, "into a well" means and includes into any portion of the well, including into the wellbore or into the near-wellbore region via the wellbore.

A portion of a wellbore may be an open hole or cased hole. In an open-hole wellbore portion, a tubing string may be placed into the wellbore. The tubing string allows fluids to be introduced into or flowed from a remote portion of the wellbore. In a cased-hole wellbore portion, a casing is placed into the wellbore, which can also contain a tubing string. A wellbore can contain an annulus. Examples of an annulus include, but are not limited to: the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

A variety of treatment fluids are used during oil or gas operations. Examples of treatment fluids include, but are not limited to, drilling fluids, spacer fluids, workover fluids, cement compositions, and stimulation fluids. For example during well completion, it is common to introduce a cement composition into an annulus in a wellbore. In a cased-hole wellbore, a cement composition can be placed into and allowed to set in an annulus between the wellbore and the casing in order to stabilize and secure the casing in the wellbore. By cementing the casing in the wellbore, fluids are prevented from flowing into the annulus. Consequently, oil or gas can be produced in a controlled manner by directing the flow of oil or gas through the casing and into the wellhead. Cement compositions can also be used in primary or secondary cementing operations, well-plugging, or squeeze cementing.

During cementing operations, it is necessary for the cement composition to remain pumpable during introduction into the well and until the composition is situated in the portion of the well to be cemented. After the cement composition has reached the portion of the well to be cemented, the cement composition ultimately sets. As used herein, the term "set" and all grammatical variations thereof means the process of becoming hard or solid through curing. A cement composition that thickens too quickly while being pumped can damage pumping equipment or block tubing or pipes, and a cement composition that sets too slowly can cost time and money while waiting for the composition to set.

Additives are commonly included in treatment fluids. Examples of common additives include silica, elastomers, heavy-weight additives, and light-weight additives. However, problems can exist when using or including additives in a treatment fluid. One problem can be transportation of the additives to the worksite. It is sometimes desirable to transport the additives in a liquid form instead of a dry form. Another problem can occur when trying to incorporate the additive into a treatment fluid at the worksite. Some additives, for example, elastomers and other light- or heavy-weight additives can tend to float to the top or sink to the bottom of the base fluid—depending on the relative density of the additive and the base fluid. Therefore, it may be difficult to easily mix a powdered additive with a treatment fluid.

As a result of these problems, some powdered additives can be made as a liquid suspension. As used herein, a "suspension" means a heterogeneous mixture in which insoluble particles settle out of a continuous liquid phase sometime after their introduction to the continuous phase, wherein the insoluble particles have a large enough particle size to eventually settle out of the continuous liquid. Conversely, if the particles have a small enough particle size to never settle, then the system is referred to as a colloid and not a suspension. The liquid suspension can be added to a base fluid and optionally other ingredients such as cement at a worksite to form a treatment fluid.

There is a continuing need for liquid suspensions of additives. The fact that the particles of a suspension settle over time means that a suspension generally requires re-suspending the particles throughout the continuous phase via shaking or mixing prior to use—much like a medicinal suspension requires shaking prior to administering the liquid medicine to uniformly distribute the medicine throughout the continuous phase. However, mixing additive suspensions at an oil or gas worksite can be quite complicated and increase operation time and cost. Therefore, there is a need to have a liquid suspension that is stable for long periods of time (i.e., for at least 1 month or more). As used herein, the term "stable" and all grammatical variations thereof means insoluble particles are uniformly suspended for the specified period of time. As used herein, the term "uniformly suspended" means that no more than 70% of insoluble particles settle to the bottom half of the fluid. By way of example, a completely, uniformly suspended suspension would have 50% of the particles dispersed throughout the bottom half of the fluid and the other 50% of the particles dispersed throughout the top half of the fluid. As such, and as defined, uniformly suspended means that no more than 20% of the "other 50% of the particles" would settle to the bottom half of the fluid, wherein no more than a total of 70% of the particles are located in the bottom half and no less than a total of 30% of the particles are located in the top half of the fluid. It is also desirable for the additive suspension to be pourable. It is also desirable to have as high a concentration of additive in the suspension so as to provide a liquid concentrate. A liquid concentrate can help reduce storage and transportation costs because a smaller container or fewer containers would be needed for the same amount of additive.

It has been discovered that a liquid concentrate suspension of additives can be achieved by using a magnesium silicate clay in water. The clay can increase the viscosity of the water to provide a stable suspension for at least two weeks or even greater than one month.

If any laboratory test (e.g., rheology) requires the step of mixing, then the suspension is mixed according to the following procedure. The water is added to a mixing container and the container is then placed on a mixer base. The motor of the base is then turned on and maintained at 4,000 revolutions per minute "rpm" (+/−200 rpm). The clay is added to the water at a uniform rate at 4,000 rpm. A cover is then placed on the container, and the clay/water composition is mixed at 4,000 rpm (+/−200 rpm) for 15 min (+/−1 min). The additive is then added to the clay/water composition in a uniform rate at 4,000 rpm. The cover is placed back on the container, and the suspension is mixed at 12,000 rpm (+/−500 rpm) for 35 s (+/−1 s). For fluids containing elastomers, a surfactant is added at very low shear rate of 500 rpm to avoid foaming.

A treatment fluid is mixed according to the following procedure. The base fluid of the treatment fluid is added to a mixing container and the container is then placed on a mixer base. The motor of the base is then turned on and maintained at 4,000 revolutions per minute "rpm" (+/−200 rpm). The suspension is then added to the container. Any other ingredients (e.g., cement) are added to the base fluid at a uniform rate in not more than 15 seconds (s). A cover is then placed on the container, and the treatment fluid is mixed at 12,000 rpm (+/−500 rpm) for 35 s (+/−1 s).

It is to be understood that if any laboratory test (e.g., rheology) requires the test be performed at a specified temperature and possibly a specified pressure, then the temperature and pressure of the suspension or treatment fluid is ramped up to the specified temperature and pressure after being mixed at ambient temperature and pressure. For example, the treatment fluid can be mixed at 71° F. (22° C.) and 1 atm (0.1 MPa) and then placed into the testing apparatus and the temperature of the treatment fluid can be ramped up to the specified temperature. As used herein, the rate of ramping up the temperature is in the range of about 3° F./min to about 5° F./min (about 1.67° C./min to about 2.78° C./min). The purpose of the specific rate of temperature ramping during measurement is to simulate the temperature profile experienced by the treatment fluid as it is being pumped downhole. After the suspension or treatment fluid is ramped up to the specified temperature and possibly specified pressure, the suspension or treatment fluid is maintained at that temperature and pressure for the duration of the testing.

Rheology is a measure of how a material deforms and flows. The suspension or treatment fluid is mixed. The suspension or treatment fluid is placed into the test cell of a rotational viscometer, such as a FANN® Model 35 viscometer, fitted with a Bob and Sleeve attachment or FYSA (FANN® Yield Stress Apparatus) and a spring number 1. The suspension or treatment fluid is tested at the specified temperature and ambient pressure, about 1 atm (0.1 MPa). Rheology readings are taken at multiple revolutions per minute (rpm), for example, at 3, 6, 100, 200, 300, and 600.

A cement composition treatment fluid can develop compressive strength. Cement composition compressive strengths can vary from 0 psi to over 10,000 psi (0 to over 69 MPa). Compressive strength is generally measured at a specified time after the composition has been mixed and at a specified temperature and pressure. Compressive strength can be measured, for example, at a time of 24 hours. The non-destructive method continually measures correlated compressive strength of a cement composition sample throughout the test period by utilizing a non-destructive sonic device such as an Ultrasonic Cement Analyzer (UCA) available from FANN® Instruments in Houston, Tex. As used herein, the "compressive strength" of a cement composition is measured using the non-destructive method according to ANSI/API Recommended Practice 10-B2 at a specified time, temperature, and pressure as follows. The cement composition is mixed. The cement composition is aged for the specified period of time. The cement composition is then placed in an Ultrasonic Cement Analyzer and tested at a specified temperature and pressure. The UCA continually measures the transit time of the acoustic signal through the sample. The UCA device contains preset algorithms that correlate transit time to compressive strength. The UCA reports the compressive strength of the cement composition in units of pressure, such as psi or MPa.

The compressive strength of a cement composition can be used to indicate whether the cement composition has initially set or is set. As used herein, the term "set," and all grammatical variations thereof, are intended to mean the process of becoming hard or solid by curing. As used herein, the "setting time" is the difference in time between when the cement and any other ingredients are added to the water and when the composition has set at a specified temperature. It can take up to 48 hours or longer for a cement composition to set. Some cement compositions can continue to develop compressive strength over the course of several days. The compressive strength of a cement composition can reach over 10,000 psi (69 MPa).

According to an embodiment, a liquid concentrate suspension comprises: (A) water; (B) an additive; and (C) a magnesium silicate clay, wherein the clay increases the viscosity of the water, and wherein the liquid concentrate suspension is stable for a time period of at least 2 weeks.

According to another embodiment, a method of treating a subterranean formation comprises: forming a treatment fluid by adding a desired volume of the liquid concentrate suspension to at least a base fluid, wherein the treatment fluid comprises the liquid concentrate suspension and the base fluid, wherein the liquid concentrate suspension is stable for a time period of at least 2 weeks; and introducing the treatment fluid into the subterranean formation.

It is to be understood that the discussion of preferred embodiments regarding the treatment fluid or any ingredient in the treatment fluid, is intended to apply to the composition embodiments and the method embodiments. Any reference to the unit "gallons" means U.S. gallons.

The liquid concentrate suspension includes water. The water can be selected from the group consisting of freshwater, brackish water, and saltwater, in any combination thereof in any proportion. The liquid concentrate suspension can also include a water-soluble salt. Preferably, the water-soluble salt is selected from sodium chloride, calcium chloride, calcium bromide, potassium chloride, potassium bromide, magnesium chloride, and any combination thereof in any proportion. Preferably, the salt is in a concentration in the range of about 0.1% to about 40% by weight of the water.

The liquid concentrate suspension includes an additive. The liquid concentrate suspension can also include more than one additive, wherein the additives are compatible with one another and are different types of additives. For example, the liquid concentrate suspension can include a silica additive and an elastomer. The additive can be insoluble in the water. As used herein, the term "insoluble" means that less than 5 parts of the additive dissolves in 100 parts of the water. The additive can be selected from the group consisting of silica, a mechanical property enhancer for cement compositions, a fluid loss additive, a lost-circulation material, a set accelerator for cement compositions, a light-weight additive, a heavy-weight additive, and combinations thereof in any proportion.

Suitable examples of commercially-available silica include, but are not limited to, SSA-1™ and SSA-2™, marketed by Halliburton Energy Services, Inc. The mechanical property enhancer can be an elastomer. Suitable examples of commercially-available mechanical property enhancers include, but are not limited to, WELLLIFE®-665, WELLLIFE®-809, and WELLLIFE®-810, marketed by Halliburton Energy Services, Inc. Suitable examples of commercially-available fluid loss additives include, but are not limited to, HALAD®-344, HALAD®-413, and HALAD®-300, marketed by Halliburton Energy Services, Inc. Suitable examples of commercially-available set accelerators include, but are not limited to, CAL-SEAL™ 60 and ECONOLITE™, marketed by Halliburton Energy Services, Inc. Suitable examples of commercially-available light-weight additives include, but are not limited to, SPHERELITE®, Perlite, and SILICALITE™, marketed by Halliburton Energy Services, Inc. and 3M™ glass bubbles available from 3M in St. Paul, Minn. Suitable examples of commercially-available heavy-weight additives include, but are not limited to, HIGH DENSE® No. 3, HIGH DENSE® No. 4, BARITE™, and MICROMAX™, marketed by Halliburton Energy Services, Inc.

According to an embodiment, the additive may be susceptible to transportation, blending, or mixing problems, and is advantageously included in the liquid concentrate suspension to reduce or eliminate any problems or concerns when storing, transporting, or handling the additive suspension.

The liquid concentrate suspension also includes the magnesium silicate clay. The clay can also be an organically-modified magnesium silicate clay. A commercially-available example of a suitable magnesium silicate clay is LAPONITE® EP, available from BYK Additives, Ltd in Cheshire, UK. The clay increases the viscosity of the water. Without being limited by theory, it is believed that the clay can imbibe the water and swell. The swelling of the clay can increase the viscosity of the water and provide a network-type support for suspending the additive. According to an embodiment, the clay increases the viscosity of the water to at least a sufficient viscosity such that the additive is suspended in the water. According to another embodiment, the clay increases the viscosity of the water to a viscosity in the range of about 10 to about 5,000 centipoise (cP), preferably about 50 to about 2,000 cP. The clay can also cause the water to become a gel or have gel-like properties.

According to an embodiment, the clay is in a concentration by weight of the water such that the viscosity of the water is increased to at least a sufficient viscosity such that the additive is suspended in the water. According to another embodiment, the clay is in a concentration by weight of the water such that the viscosity of the water is increased to a viscosity in the range of about 10 to about 5,000 cP, preferably about 50 to about 2,000 cP. According to yet another embodiment, the clay is in a concentration in the range of about 0.2% to about 3% by weight of the water, preferably about 0.5% to about 2.5% by weight of the water.

The liquid concentrate suspension can be pourable upon initial mixing and after aging for at least 2 weeks, preferably at least 1 month, more preferably greater than one month. "Pourable" means that the liquid concentrate suspension is capable of being poured out of a container, such as a mixing or storage container, without the need for a pump or other shear to be imparted to the suspension. In this manner, the desired volume of the liquid concentrate suspension can be added to at least the base fluid to form the treatment fluid via pouring the suspension into a holder, container, or mixer containing at least the base fluid. Preferably, the clay does not so greatly increase the viscosity of the water such that the liquid concentrate suspension is un-pourable.

The additive can be included in the liquid concentrate suspension in a relatively high concentration compared to a suspension that is not a concentrate. For example, as a liquid concentrate, the additive can be in a concentration in the suspension of at least 20% volume by volume of the water. The additive can also be in a concentration in the range of about 20% to about 80% volume by volume of the water, preferably about 50% to about 80% volume by volume of the water.

The liquid concentrate suspension is stable for at least 2 weeks, preferably at least 1 month, more preferably greater than 1 month. According to an embodiment, the clay increases the viscosity of the water to at least a sufficient viscosity such that the liquid concentrate suspension is stable for at least 2 weeks, preferably at least 1 month, more preferably greater than 1 month.

Some additives are hydrophobic or contain hydrophobic moieties. For these additives, the liquid concentrate suspension can further include a surfactant. A surfactant is amphiphilic, containing both a hydrophobic tail group and a hydrophilic head group. Surfactants are compounds that lower the interfacial tension between a liquid and a solid. The surfactant can function as a surface-active dispersant to help improve the separation of the additive in the water and inhibit clumping of the additive particles. The surfactant can be used to help disperse and suspend the hydrophobic additives in the water. The surfactant can be a non-ionic surfactant. The surfactant can be in a concentration in the range of about 0.01% to about 1% by weight of the water, preferably about 0.05% to about 0.5% by weight of the water.

The treatment fluid is formed by adding a desired volume of the liquid concentrate suspension to at least a base fluid. The treatment fluid comprises the liquid concentrate suspension and the base fluid. The treatment fluid can include other ingredients in addition to the liquid concentrate suspension and the base fluid. For example, the treatment fluid can further include one or more ingredients selected from cement, a mechanical property enhancer for cement compositions, a friction reducer, a fluid loss additive, a lost-circulation material, a set retarder for cement compositions, a set accelerator for cement compositions, a light-weight additive, and a heavy-weight additive. According to an embodiment, the other ingredients are not the same as the additive—otherwise there would not be a need for the liquid concentrate suspension. If the treatment fluid further includes one or more other ingredients, then the liquid concentrate suspension can be added to the base fluid and the one or more other ingredients.

The base fluid can be an aqueous liquid, a liquid hydrocarbon, or mixtures thereof. The treatment fluid can be, without limitation, a cement composition, a drilling fluid, a spacer fluid, a workover fluid, or a stimulation fluid.

The desired volume of the liquid concentrate suspension can be selected such that the additive is in a desired concentration by weight of the liquid of the treatment fluid. The liquid of the treatment fluid can include the water from the liquid concentrate suspension and the base fluid. The desired concentration by weight of the liquid of the treatment fluid can be selected depending on the exact additive(s) included in the liquid concentrate suspension. By way of example, if the additive is silica, then the desired concentration could be in the range of about 50% to about 95% by weight of the liquid of the treatment fluid. By way of another example, if the additive is an elastomer mechanical property enhancer for a cement composition, then the desired concentration could be in the range of about 10% to about 30% by weight of the liquid of the treatment fluid. The desired volume will be dependent on the concentration of the additive in the liquid concentrate suspension, for example a suspension having 60% of the additive and 40% of the water versus 21% of the additive and 79% of the water might require less volume be added to the base fluid to achieve the desired concentration by weight of the liquid of the treatment fluid. The desired volume can also be selected such that the treatment fluid has a specific density. This embodiment can be useful when the additive is a light- or heavy-weight additive.

If the treatment fluid is a cement composition, then the desired volume of the liquid concentrate suspension can be selected such that the additive is in a desired concentration by weight of the cement of the cement composition. By way of example, if the additive is silica, then the desired concentration could be in the range of about 20% to about 50% by weight of the cement. By way of another example, if the additive is an elastomer mechanical property enhancer, then the desired concentration could be in the range of about 5% to about 15% by weight of the cement.

It is to be understood that the liquid concentrate suspension is a standalone composition comprising the water, the additive, and the clay. The liquid concentrate suspension can include other ingredients, such as the surfactant, so long as the suspension includes the listed ingredients and is stable for at least 2 weeks. The liquid concentrate suspension should not include other ingredients that are or will be included in the final composition of the treatment fluid, such as cement, as this would eliminate the need for the liquid concentrate suspension. It is also to be understood that the liquid concentrate suspension is added to at least the base fluid to form the final treatment fluid. There can also be more than one type of liquid concentrate suspension that is added to at least the base fluid to form the final treatment fluid. This embodiment can be useful when the additives for the suspensions are incompatible or require separate ingredients in the liquid concentrate suspension (e.g., the addition of the surfactant). In this manner, more than one type of liquid concentrate suspension can be made and both, or all of the suspensions, can be added to at least the base fluid to form the treatment fluid.

The method embodiments include introducing the treatment fluid into the subterranean formation. The step of introducing can be for the purpose of at least one of the following: drilling a wellbore; performing a completion operation; performing an enhanced recovery operation; well completion; foam cementing; primary or secondary cementing operations; well-plugging; squeeze cementing; or gravel packing. According to an embodiment, the subterranean formation is penetrated by a well. The well can be, without limitation, an oil, gas, or water production well, an injection well, or a geothermal well. According to this embodiment, the step of introducing includes introducing the treatment fluid into the well. According to another embodiment, the subterranean formation is penetrated by a well and the well includes an annulus. According to this other embodiment, the step of introducing includes introducing the treatment fluid into a portion of the annulus.

EXAMPLES

To facilitate a better understanding of the present invention, the following examples of certain aspects of preferred embodiments are given. The following examples are not the only examples that could be given according to the present invention and are not intended to limit the scope of the invention. All of the suspensions or cement composition treatment fluids were mixed and tested according to the procedure described in the Detailed Description section above.

Table 1 contains rheology data for a liquid concentrate suspension at a time of initial mixing and after static aging for 1 month at a temperature of 71° F. (22° C.). Rheology testing was performed at a temperature of 71° F. (22° C.). The liquid concentrate suspension included 600 grams (g) of SSA-1™ silica additive, 400 g tap water, and 5.2 g LAPONITE® EP magnesium silicate clay. The silica additive was in a concentration of 60% by weight of the suspension. As can be seen in Table 1, the suspension exhibited very good rheology upon initial mixing and after aging for 1 month. Moreover, the difference in rheology readings is very minimal when comparing the 1 month time versus the initial mixing time. This indicates that the liquid concentrate suspension is stable and aging for long periods of time does not adversely affect the stability or other properties of the suspension.

TABLE 1

| | \multicolumn{6}{c}{Rheology (rpm)} | | | | | |
|---|---|---|---|---|---|---|
| | 3 | 6 | 100 | 200 | 300 | 600 |
| Initial Mixing | 25 | 31 | 94 | 137 | 171 | 255 |
| Aging 1 month | 38 | 47 | 114 | 153 | 186 | 258 |

Table 2 contains a list of ingredients and each ingredient's concentration, expressed in units of % by weight of the cement (% bwoc), for four different cement composition treatment fluids. Compositions #1 and #2 had a density of 15.85 pounds per gallon (ppg) and compositions #3 and #4 had a density of 17 ppg. Composition #1 and #3 contained powdered SSA-1™ silica additive. A specific volume of a liquid concentrate suspension from Table 1 after being static aged for 1 month at a temperature of 71° F. (22° C.) was added to compositions #2 and #4. The SSA-1™ silica additive concentration for compositions #2 and #4 that included the liquid concentrate suspension is listed in units of % active solids (active additive) bwoc. In other words, there was 35 g of total additive from the suspension per 100 g of cement. HALAD®-344 is a fluid loss additive and SCR-100™ and SCR-500™ are both cement set retarders.

TABLE 2

| Ingredients | Comp. #1 | Comp. #2 | Comp. #3 | Comp. #4 |
|---|---|---|---|---|
| Class H Cement | 100 | 100 | 100 | 100 |
| SSA-1 ™ | 35 | — | 35 | — |
| 60% Aqueous SSA-1 ™ Suspension | — | 35% active | — | 35% active |
| HALAD ®-344 | 0.6 | — | 0.6 | — |
| SCR-100 ™ | 0.4 | 0.4 | — | — |
| SCR-500 ™ | — | — | 0.7 | 0.7 |
| Water | 54.85 | 31.50 | 41.00 | 17.70 |

Table 3 contains rheology data for cement compositions #1 and #2 at a temperature of 71° F. (22° C.). As can be seen from the data, the cement composition containing the liquid concentrate suspension had very similar rheology values compared to cement composition #1 containing the powdered silica additive. Moreover, both compositions exhibited good rheology.

TABLE 3

| | \multicolumn{7}{c}{Rheology (rpm)} | | | | | | |
|---|---|---|---|---|---|---|---|---|
| Composition # | 3 | 6 | 30 | 60 | 100 | 200 | 300 | 600 |
| 1 | 3 | 4 | 10 | 19 | 31 | 59 | 88 | 165 |
| 2 | 10 | 14 | 32 | 43 | 58 | 88 | 111 | 184 |

Table 4 contains compressive strength data for cement compositions #1-#4. Compressive strength testing was conducted at a time of 24 hours, a temperature of 217° F. (103° C.) for compositions #1 and #2 and 300° F. (149° C.) for compositions #3 and #4, and a pressure of 3,000 psi (20.7 MPa). As can be seen from the data, composition #2 (containing the suspension) had a slightly higher compressive strength compared to composition #1 (containing the powdered additive), and composition #4 (containing the suspension) had a slightly higher compressive strength compared to composition #3 (containing the powdered additive). This indicates that use of a liquid concentrate suspension instead of a dry, powdered form of a silica additive can provide very suitable and even slightly improved compressive strengths in a cement composition.

TABLE 4

| Composition # | Compressive Strength (psi) |
|---|---|
| 1 | 2,210 |
| 2 | 2,405 |
| 3 | 6,965 |
| 4 | 7,585 |

Table 5 contains rheology data for a liquid concentrate suspension at a time of initial mixing and after static aging for 1 month at a temperature of 71° F. (22° C.). Rheology testing was performed at a temperature of 71° F. (22° C.). The liquid concentrate suspension included 110 g of WELL-LIFE®-665 elastomer mechanical property enhancer as the additive, 400 g tap water, 0.4 g EASY-WET™ 20 surfactant (available from Ashland Inc. in Covington, Kentucky), and 4 g LAPONITE® EP magnesium silicate clay. As can be seen from the data, the suspension exhibited very good rheology upon initial mixing and after aging for 1 month. Moreover, the difference in rheology readings is very minimal when comparing the 1 month time versus the initial mixing time. This indicates that the liquid concentrate suspension is stable and aging for long periods to time does not adversely affect the stability or other properties of the suspension.

TABLE 5

| | \multicolumn{6}{c}{Rheology (rpm)} | | | | | |
|---|---|---|---|---|---|---|
| | 3 | 6 | 100 | 200 | 300 | 600 |
| Initial Mixing | 9 | 11 | 26 | 40 | 51 | 95 |
| Aging 1 month | 12 | 14 | 30 | 42 | 53 | 98 |

Table 6 contains a list of ingredients and each ingredient's concentration expressed in units of % by weight of the cement (% bwoc) for two different cement composition treatment fluids having a density of 15.1 ppg. Composition #5 contained powdered WELLLIFE®-665 elastomer additive. A specific volume of a liquid concentrate suspension from Table 4 after being static aged for 1 month at a temperature of 71° F. (22° C.) was added to composition #6. The WELLLIFE®-665 elastomer additive concentration for composition #6 is listed in units of % active solids (active additive) bwoc. In other words, there was 10 g of total additive from the suspension per 100 g of cement. HALAD®-344 is a fluid loss additive and SCR-100™ is a cement set retarder.

TABLE 6

| Ingredients | Comp. #5 | Comp. #6 |
|---|---|---|
| Class H Cement | 100 | 100 |
| SSA-1 ™ | 35 | 35 |
| WELLLIFE ®-665 | 10 | — |
| 21.6% Aqueous WELLLIFE ®-665 Suspension | — | 10% active |

TABLE 6-continued

| Ingredients | Comp. #5 | Comp. #6 |
|---|---|---|
| HALAD ®-344 | 1.0 | — |
| SCR-100 ™ | 0.4 | 0.4 |
| Water | 55.5 | 19.1 |

Table 7 contains compressive strength data for cement compositions #5 and #6. Compressive strength testing was conducted at a time of 24 hours, a temperature of 217° F. (103° C.), and a pressure of 3,000 psi (20.7 MPa). As can be seen from the data, composition #6 (containing the suspension) had a very comparable compressive strength compared to composition #5 (containing the powdered additive). This indicates that use of a liquid concentrate suspension instead of a dry, powdered form of an elastomer additive can provide very comparable and desirable compressive strengths in a cement composition.

TABLE 7

| Composition # | Compressive Strength (psi) |
|---|---|
| 5 | 1,376 |
| 6 | 1,356 |

The exemplary fluids and additives disclosed herein may directly or indirectly affect one or more components or pieces of equipment associated with the preparation, delivery, recapture, recycling, reuse, and/or disposal of the disclosed fluids and additives. For example, the disclosed fluids and additives may directly or indirectly affect one or more mixers, related mixing equipment, mud pits, storage facilities or units, fluid separators, heat exchangers, sensors, gauges, pumps, compressors, and the like used to generate, store, monitor, regulate, and/or recondition the exemplary fluids and additives. The disclosed fluids and additives may also directly or indirectly affect any transport or delivery equipment used to convey the fluids and additives to a well site or downhole such as, for example, any transport vessels, conduits, pipelines, trucks, tubulars, and/or pipes used to fluidically move the fluids and additives from one location to another, any pumps, compressors, or motors (e.g., topside or downhole) used to drive the fluids and additives into motion, any valves or related joints used to regulate the pressure or flow rate of the fluids, and any sensors (i.e., pressure and temperature), gauges, and/or combinations thereof, and the like. The disclosed fluids and additives may also directly or indirectly affect the various downhole equipment and tools that may come into contact with the fluids and additives such as, but not limited to, drill string, coiled tubing, drill pipe, drill collars, mud motors, downhole motors and/or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A method of treating a subterranean formation comprising:
    forming a treatment fluid by adding a desired volume of a liquid concentrate suspension to at least a base fluid, wherein the treatment fluid comprises the liquid concentrate suspension and the base fluid, and wherein the liquid concentrate suspension consists essentially of:
    (A) water;
    (B) an additive in a concentration of about 50% to about 80% by volume of the water; wherein if the additive comprises a hydrophobic group, the liquid concentrate suspension then additionally comprises a surfactant; and
    (C) an organically functionalized magnesium silicate clay, wherein the clay increases the viscosity of the liquid concentrate suspension to a viscosity of about 500 cP to about 2000 cP, wherein the clay is in a concentration in a range of about 0.2% to about 2.5% by weight of the water,
    wherein the liquid concentrate suspension is stable for a time period of at least 2 weeks; and
    introducing the treatment fluid into the subterranean formation.

2. The method according to claim 1, wherein the water is selected from the group consisting of freshwater, brackish water, and saltwater, in any combination thereof in any proportion.

3. The method according to claim 1, wherein the additive is selected from the group consisting of silica, a mechanical property enhancer for cement compositions, a fluid loss additive, a lost-circulation material, a set accelerator for cement compositions, a light-weight additive, a heavy-weight additive, and combinations thereof in any proportion.

4. The method according to claim 1, wherein the additive is insoluble in the water.

5. The method according to claim 1, wherein the clay increases the viscosity of the liquid concentrate suspension to a viscosity in the range of about 500 to about 5,000 centipoise.

6. The method according to claim 1, wherein the clay is in a concentration by weight of the water such that the viscosity of the liquid concentrate suspension is increased to a viscosity in the range of about 500 to about 5,000 centipoise.

7. The method according to claim 1, wherein the clay is in a concentration in the range of about 0.5% to about 2.5% by weight of the water.

8. The method according to claim 1, wherein the liquid concentrate suspension is pourable upon initial mixing and after aging for at least 2 weeks.

9. The method according to claim 1, wherein the liquid concentrate suspension is stable for at least 1 month.

10. The method according to claim 9, wherein the clay increases the viscosity of the water to at least a sufficient viscosity such that the liquid concentrate suspension is stable for at least 1 month.

11. The method according to claim 1, wherein the additive is an elastomer.

12. The method according to claim 1, wherein the surfactant is a non-ionic surfactant.

13. The method according to claim 12, wherein the surfactant is in a concentration in the range of about 0.01% to about 1% by weight of the water.

14. The method according to claim 1, wherein the base fluid is an aqueous liquid, a liquid hydrocarbon, or mixtures thereof.

15. The method according to claim 1, wherein the treatment fluid is a cement composition, a drilling fluid, a spacer fluid, a workover fluid, or a stimulation fluid.

16. The method according to claim 1, wherein the treatment fluid is introduced into the subterranean formation using a pump.

17. A liquid concentrate suspension for use in a subterranean formation consisting essentially of:

water;

an additive in a concentration of about 50% to about 80% by volume of the water;

wherein if the additive comprises a hydrophobic group, the liquid concentrate suspension then additionally comprises a surfactant; and an organically functionalized magnesium silicate clay, wherein the clay increases the viscosity of the liquid concentrate suspension to at least a viscosity of 500 cP, wherein the clay is in a concentration in a range of about 0.2% to about 2.5% by weight of the water, wherein the liquid concentrate suspension is stable for a time period of at least 2 weeks.

* * * * *